US011483346B2

(12) United States Patent
Santana De Oliveira et al.

(10) Patent No.: US 11,483,346 B2
(45) Date of Patent: Oct. 25, 2022

(54) REINFORCEMENT LEARNING FOR APPLICATION RESPONSES USING DECEPTION TECHNOLOGY

(71) Applicant: SAP SE, Walldorf (DE)

(72) Inventors: Anderson Santana De Oliveira, Antibes (FR); Cedric Hebert, Mouans-Sartoux (FR); Merve Sahin, Antibes (FR)

(73) Assignee: SAP SE, Walldorf (DE)

( * ) Notice: Subject to any disclaimer, the term of this patent is extended or adjusted under 35 U.S.C. 154(b) by 251 days.

(21) Appl. No.: 16/884,521

(22) Filed: May 27, 2020

(65) Prior Publication Data

US 2021/0377307 A1 Dec. 2, 2021

(51) Int. Cl.
*H04L 9/40* (2022.01)
*G06K 9/62* (2022.01)

(52) U.S. Cl.
CPC ........ *H04L 63/1491* (2013.01); *G06K 9/6256* (2013.01); *G06K 9/6262* (2013.01); *H04L 63/1416* (2013.01)

(58) Field of Classification Search
CPC . H04L 63/1491; H04L 63/1416; H04L 63/20; G06K 9/6256; G06K 9/6262
USPC .......................................................... 726/23
See application file for complete search history.

(56) References Cited

U.S. PATENT DOCUMENTS

| 7,283,045 | B1 * | 10/2007 | Manz | G08B 27/005 340/517 |
| 8,925,080 | B2 * | 12/2014 | Hebert | H04L 63/145 726/23 |
| 9,503,470 | B2 * | 11/2016 | Gertner | H04L 63/1425 |
| 9,792,196 | B1 * | 10/2017 | Ismael | G06F 11/362 |
| 10,476,895 | B2 | 11/2019 | Hebert | |

(Continued)

OTHER PUBLICATIONS

Tian et al., "ELF: An Extensive, Lightweight and Flexible Research Platform for Real-time Strategy Games" (14 pages) arXiv:1707.01067v2 [cs.AI], Nov. 10, 2017.

(Continued)

*Primary Examiner* — Badri Narayanan Champakesan
(74) *Attorney, Agent, or Firm* — Sterne, Kessler, Goldstein & Fox P.L.L.C.

(57) ABSTRACT

Disclosed herein are method, system, and computer-readable storage medium embodiments for reinforcement learning applied to application responses using deception technology. An embodiment includes configuring at least one computer processor to perform operations that include detecting an unauthorized access attempt associated with an attacker, and recording an input log that includes inputs received from the attacker. An embodiment may further include operations of generating a state representation corresponding to an execution state of at least one software application, computing one or more predicted inputs, based at least in part on the input log and the state representation, and modifying, via at least one software agent, the execution state of at least the software application, based at least in part on the one or more predicted input. Types of attacks (unauthorized access attempts) may include cross-site scripting, cross-site request forgery, SQL injection, code injection, brute-force attack, buffer-overflow attack, or a combination thereof.

14 Claims, 4 Drawing Sheets

(56) References Cited

U.S. PATENT DOCUMENTS

| | | | |
|---|---|---|---|
| 2010/0095351 A1* | 4/2010 | Liu | H04L 63/1458 |
| | | | 726/23 |
| 2018/0219909 A1* | 8/2018 | Gorodissky | H04L 43/50 |
| 2019/0081980 A1* | 3/2019 | Luo | G06N 7/005 |
| 2019/0215330 A1* | 7/2019 | Neuvirth | H04L 63/1425 |
| 2020/0259852 A1* | 8/2020 | Wolff | H04L 63/1441 |
| 2020/0285737 A1* | 9/2020 | Kraus | G06F 21/552 |
| 2021/0011985 A1* | 1/2021 | Korotaev | G06F 21/126 |
| 2021/0264025 A1* | 8/2021 | Givental | G06F 21/577 |

OTHER PUBLICATIONS

Zelinka, Mikuláš, "Using reinforcement learning to learn how to play text-based games" (68 pages), arXiv:1801.01999v1 [cs.CL], Jan. 6, 2018.

Tay, Wendy, "TextWorld: A learning environment for training reinforcement learning agents, inspired by text-based games" (4 pages), Microsoft Research Blog, Jul. 12, 2018.

Hebert et al., U.S. Appl. No. 16/549,087, filed Aug. 23, 2019.

* cited by examiner

| Concept | Definition | Representation |
|---|---|---|
| State | A description of the state of the world. There is no information about the world which is hidden from the state. | Data in the application storage and data already disclosed to the attacker (e.g., request/response log). |
| Observation | Partial description of a state. Observation may omit some information about the state. | Part of the state, e.g., response status, any cookie(s), and any response body for the latest request. |
| Action Spaces | Different environments may allow different kinds of actions. The set of valid actions in a given environment may be referred to as the action space. | Requests that may be sent, and possible responses. This may include HTTP verbs, cookies, parameter values, and payload to be submitted, e.g., to a web application or service. |
| Policy | A rule or set of rules used by an agent to decide what actions to take. Rules may be deterministic or stochastic. | Types of rules may be implementation-specific; stochastic, deterministic, or a combination thereof may be used. |
| Trajectory | A sequence of states and actions in the world. Trajectories are also frequently called episodes or rollouts. | A session trace, a sequence of HTTP requests, corresponding responses, etc. An episode may finish when the attacker abandons without damaging confidentiality, integrity, or availability of a given application or service. |
| Reward / Return | Reward function $R$, for reinforcement learning, may depend on the current state, the action just taken (e.g., change of state leading to the current state), and a (possible or predicted) next state. A goal of an agent may be to increase cumulative reward / return over a given trajectory. | In non-limiting practical examples, a defensive agent may be rewarded a point if an attacker tries to exploit the same parameter using the same attack action more than once. An offensive agent may be rewarded a point if it finds a vulnerability randomly inserted in an application when the environment is started, in some embodiments. |
| Q-Table | Greatest expected future reward(s) for each action at each state. | Defined according to experiments. If an objective metric of compromised confidentiality, integrity, or availability exceeds a predetermined level, for an attacker action due at least in part to a defensive agent, allow the defensive agent to score fewer points in return. Actions that fail to give new information to mount an attack (discouraging the attacker) deduct points. The more an attacker spends time or resources, the more the defensive agent is winning. |

FIG. 2

REINFORCEMENT LEARNING FOR APPLICATION RESPONSES USING DECEPTION TECHNOLOGY

BACKGROUND

Conventional blue-team cyber-security defense, with a team of security experts engaging in live incident response, may be costly and resource-intensive. There has long been a need in the industry, especially for web applications, to automate defensive cyber-security, but such attempts at automation have also been costly and resource-intensive, sometimes for similar reasons as with live teams, as well as for other considerations unique to automation.

Developing built-in runtime self-defending features for applications or services may be costly. Software development teams are often expected to focus on functional features, instead of investing in creating sophisticated defenses for applications, even as such teams may already struggle to deliver the basics of secure software development. In a new age of modern complexities surrounding modern architecture of connected software and services, secure development of competitive online applications may be cost-prohibitive for many if not most application/service providers.

BRIEF DESCRIPTION OF THE DRAWINGS

The accompanying drawings are incorporated herein and form a part of the specification.

FIG. 2 depicts an example mapping of RL concepts to elements of a given RL environment, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
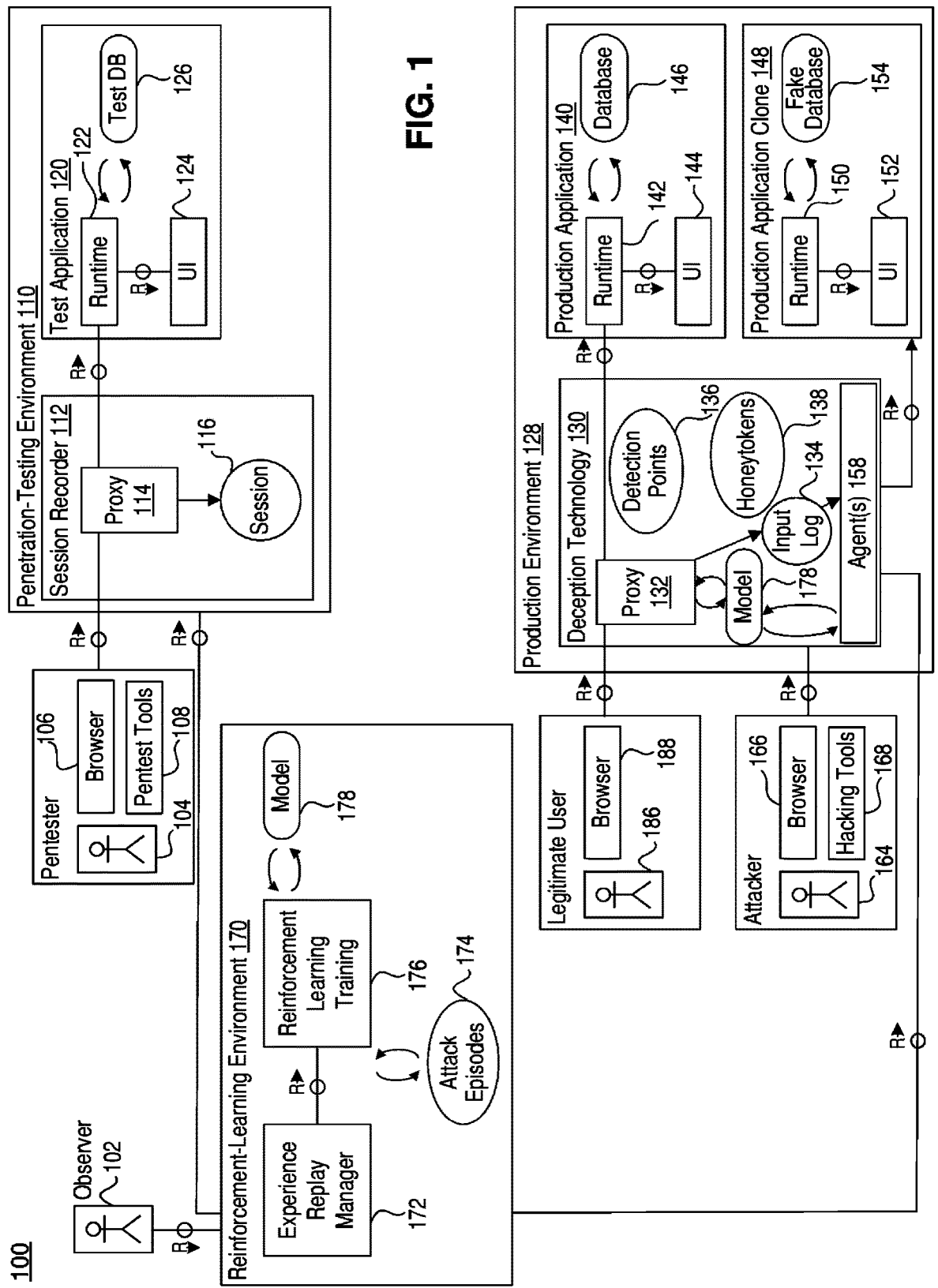
FIG. 1 depicts an example system in which enhanced deceptive technology may be implemented and applied, according to an embodiment.

Provided herein are system, apparatus, device, method and/or computer program product embodiments, and/or combinations and sub-combinations thereof, for reinforcement learning applied to application responses using deception technology.

The enhanced techniques disclosed herein (as well as other techniques that will be apparent to persons skilled in the relevant art(s) based on the teachings provided herein) may be used to train applications or services to craft specific responses to malicious requests to lead attackers to believe that they are on track to exploit a given targeted vulnerability. Additionally, the enhanced techniques disclosed herein may also be used to implement a reinforcement-learning framework to train applications to produce deceptive request responses that have higher probability of spending attacker resources, once an attacker session has been identified. According to the enhanced techniques disclosed herein, an environment where different reward functions and agent policies may be tested and iterated upon so as to improve self-defending capabilities for connected services or applications, for example.

Additionally, for purposes of this specification, an attacker may be understood as any user or other party engaged in or associated with carrying out any unauthorized access or attempt at unauthorized access against a given service or application, or as similarly understood by equivalent definitions in technical fields related to information security. Unauthorized access attempts may be any malicious or potentially harmful activity not specifically authorized by an owner, maintainer, operator, service provider, etc., hosting or providing the service or application.

Unauthorized access attempts may be simulated via automated or manual penetration testing, even if this type of test is performed with consent or authorization secured from the same owner, maintainer, operator, service provider, etc., according to some embodiments. For example, unauthorized access may be described as an intrusion or attack. An unauthorized access attempt may also be considered an attack (even if not successful), or an intrusion attempt, for example. Other equivalent definitions of unauthorized access, unauthorized access attempt, malicious inputs, harmful activity, etc., may be applied here in keeping with the scope of this disclosure.

Real-time application self-protection (RASP) is a term associated with autonomous defensive behavior for applications or services facing attacks. The "self-protection" may signify that such behavior is not delegated to the platform where these applications or services run, for example, in a cloud-based environment, such as may be part of an offering for software as a service (SaaS), managed software as a service (MSaaS), platform as a service (PaaS), etc.

Most self-defending actions of existing technology merely block attacker sessions or application responses if an attack is identified. Application-level attacks may be identified using defensive measures such as tainting techniques, canaries, or honeytokens, which may be configured such that the defensive measures may only be triggered when intentionally malicious actions are performed by an attacker. These defensive measures may be used in combination with other techniques for intrusion detection or prevention, such as intrusion detection systems (IDS) or intrusion prevention systems (IPS), for example.

Deceptive technologies may bring additional advantages to application self-protection compared with the simple "block all attacks" default response in RASP. An example approach may include routing or re-routing an attacker session away from a production system and toward a clone of the production application, e.g., on a high-interaction honeypot, which may include a clone of a production application, but with fake database instead of the production database. In turn, this approach may allow administrators or other researchers to collect a considerable amount of data not only on the attacker behavior (potentially identifying similar attacks elsewhere), in addition to learning about uncovered vulnerabilities in the targeted application or service. See U.S. Pat. Nos. 8,925,080 and 4,476,895, the entireties of which are incorporated by reference herein.

Such an approach may work well for authenticated sessions, defending against malicious insiders, or in cases where an external attacker may have gained access to valid credentials. Thus, there is a need for applying intelligent, autonomous deception for non-authenticated sessions. Securing applications against outsider attacks may be exposed and mitigated following non-authenticated penetration testing exercises. Training data to protect against insiders (and against lost credentials) may be gained by recording penetration testing (or actual attacks) on authenticated sessions.

In addition to gathering intelligence about attackers and vulnerabilities, deceptive technologies may lend further advantages to service providers and application hosts, in the form of asymmetric defense, encouraging attackers to spend more of their resources pursuing harmless attacks on decoys, and thereby diverting other attacks that may otherwise have been harmful.

However, before the present disclosure of the enhanced techniques described herein, such deceptive technology has been difficult to automate. Typically, defensive security researchers may need to engage in real-time live interactions with attackers and any vulnerable systems, and may need to guess at how to keep the attacker engaged, often based on intuition.

Reinforcement learning (RL) in a multi-agent environment, using models, e.g., RL model 178, of attack sessions captured during penetration testing (also referred to as pentesting), may provide state and observation information (in the RL terminology). As part of the enhanced techniques described herein, such RL based on observation of state (e.g., program execution state, system state, etc.) and observation of behavior (e.g., attacker inputs, application outputs, etc.) may result in enhanced deceptive technology that autonomously learns to produce deceptive outputs to attackers, and in such a way as to improve a likelihood that the attacker will continue to engage in an attack. This autonomous adaptation thus may yield significant benefits for both administrators, developers, and security researchers, beyond using passive honeypots or IDS/IPS providing only network-based responses, or even beyond having a live incident response team fully engaged at any given time.

Applying RL may additionally yield further benefits. For example, deceptive technology may learn which responses will lead to overall greater reward with a given state and an attacker action (e.g., service request, such as in HTTP for a web application). In one use case, after probing a target system, it is expected that an attacker may be inclined to move to the next promising lead as soon as the attacker reaches a dead end. The next lead may represent the path of least resistance to the attacker.

To prevent or delay attackers' explorations of new leads, the enhanced deceptive technology disclosed herein may be configured to influence attackers to make them stay in dead ends or poor leads for more time and/or to expend more resources on service requests there, as the deceptive responses will make attackers believe that the current leads are still exploitable. Another benefit of RL, apart from deceptive technology, is on the offensive side, as learning attack patterns from various attackers in the wild may further facilitate automated penetration testing using RL-trained attacker agents. For the training phase(s), observer 102 may be a researcher or data scientist, for example, who may assist with building model 178. Other than reinforcement learning, other forms of machine learning, such as supervised learning, unsupervised learning, or a combination thereof, may additionally or alternatively be used, according to some embodiments.

According to some embodiments, agents may be considered to be a learning component of RL. Generally, in the context of RL, the term "agent" refers to a software component, e.g., a "software agent," but other equivalent functionality may be implemented in firmware, hardware, or other equivalent means. In a network sense, agents may be stationary or mobile, confined to a particular location or otherwise able to move about a network to any accessible location, and, in some embodiments, autonomously.

By observing the environment, agents may select and perform actions which result in rewards, or penalties in the case of negative rewards. Agents may autonomously learn strategies (also referred to as policies) to improve or increase rewards over time. Policies may define action(s) to be performed when an agent may make a decision or determination in a given situation. Development of autonomous agents with RL may be applied to games, in some use cases (see, e.g., Tian et al., "ELF: An Extensive, Lightweight and Flexible Research Platform for Real-time Strategy Games," arXiv:1707.01067v2 [cs.AI], Nov. 10, 2017; Mikuláš Zelinka, "Using reinforcement learning to learn how to play text-based games," arXiv:1801.01999v1 [cs.CL], Jan. 6, 2018; Wendy Tay, "TextWorld: A learning environment for training reinforcement learning agents, inspired by text-based games," Microsoft Research Blog, Jul. 12, 2018; each of these documents is entirely incorporated by reference herein). Text-based games or board games are cited, because they may be considered to be closer to the area of application of RL described here, as opposed to other games that may involve image processing, for example.

RASP generally relates to detecting and reacting on attacks. By contrast, per the enhanced techniques disclosed herein, applications and services implementing the deceptive technology disclosed herein may craft context-relevant responses that may mislead and induce attackers to persevere in a fruitless path, enhancing any asymmetric defense strategy. For instance, a web application or service enhanced with deceptive technology may be configured using RL and autonomous agents to provide outputs that may include typical responses to indicate that a parameter may accept an input containing SQL injection or other code injection, according to some embodiments in some use cases.

In some embodiments of the enhanced techniques described herein, deceptive technology may be applied in phases, such as a phase of data collection from penetration-testing sessions (e.g., by a human expert), a phase of reinforcement-learning training 176 defensive agents (or offensive software agents, for other use cases), and a phase of deploying the agents at runtime.

A defensive agent may be configured to help an application to defend itself and may be deployed at runtime with help from detective components (e.g., intrusion detection) to increase a likelihood that deceptive technology is active in malicious sessions as opposed to normal or otherwise legitimate sessions. For example, in some embodiments, positively identifying attackers may be achieved with help of fingerprinting, such as that of U.S. patent application Ser. No. 16/549,087, the entirety of which is incorporated by reference herein. Offensive agents may be helpful to automate penetration-testing activities, in full or in part.

The list below enumerates several non-exhaustive, non-limiting examples of specific attack patterns against which applications may self-defend using assistance from deceptive technology per the enhanced techniques described herein. Patterns of self-defense and deception may vary depending on the type or types of the given attack(s), or a given combination of attacks.

Example 1

Login Brute-Force Attacks

A web-application defense agent may learn, using a reward function in real time or from recorded logs, that an attacker may perform repeatedly more login attempts if a web application responds with HTTP status code 401 (unauthorized) without indicating a maximum number of login attempts permitted.

Example 2

SQL Injection

A web-application defense agent may learn, using a reward function in real time or from recorded logs, that an HTTP response containing a database parse error following a request containing SQL-injection input may tend to be followed by subsequent requests of the same type. Thus, reproducing this pattern of responses may be expected to drive the attacker to explore more options for SQL-injection inputs on for the same input parameter, in some situations.

Example 3

Cross-Site Request Forgery (XSRF)

A web-application defense agent may lead an attacker to believe that XSRF protection is ineffective by responding with HTTP status code 200 (OK) for HTTP requests configured to change state of an application or service (e.g., POST, PUT, or DELETE), where such requests originate from other domains separate from that of the target application or service.

Example 4

Cross-Site Scripting (XSS)

A web-application defense agent may learn, using a reward function in real time or from recorded logs, to reproduce, in a given HTTP response body, some or all of a given JavaScript input provided by an attacker, so as to lead the attacker to believe that XSS protection is not working at the target web-application or corresponding service. For instance, an attacker's HTTP request, such as
POST /bank/apply.aspx
Cookie:SID=123456;
  UserID=1001160&&transaction=110011<script>alert (123)</script>;
  may lead to a deceptive response containing
HTTP/1.1 200 OK
. . .
<!DOCTYPE HTML . . . >
<html> . . .
<script>alert(123)</script>;
</html>

Thus, in the case of Example 4, the agent may lead the attacker to believe that the targeted web application or corresponding service may potentially allow for execution of arbitrarily input JavaScript code in a web browser. As a result, the agent may encourage the attacker to pursue what is likely perceived to be a vulnerability in the target for XSS.

FIG. 1 depicts an example system in which enhanced deceptive technology may be implemented and applied, according to an embodiment.

An open-ended, non-limiting example of several components of a networked system 100 is shown in FIG. 1. An element of the enhanced techniques disclosed herein may include a reinforcement-learning environment that may be configured to allow agents to observe an environment of a given network, system, service, application, or a combination thereof, to name a few non-limiting examples. In so doing, a given agent may, based at least in part on observation, create a representation of actual states and possible states (e.g., from which predicted states may be evaluated or selected), e.g., for the application, or any corresponding service, system, network, etc., as may be appropriate. Moreover, a defensive agent may learn how to craft HTTP response structures following a policy configured to improve future reward of any subsequent actions of the agent, following observed actions of an attacker. In a case of offensive automation of attacks, offensive agents may learn how to craft HTTP requests following a policy configured to increase a likelihood of exploitation of vulnerabilities, according to some embodiments.

Penetration-testing environment 110 may include a fresh install of a given application to be test application 120, which may include its own runtime 122 and user interface (UI) 124. Test application 120 may have access to storage, such as a separate test database (test DB 126), which may be unconnected with any production database (e.g., database 146). Pentester 104 may be a human operator who conducts penetration testing, and who may alternatively be referred to as a penetration tester, offensive security researcher, etc. Test application 120 may be deployed, e.g., via package management, virtualization, containerization, jails, zones, or equivalent technology. Similar deployments, or any combination thereof, may be available for deployments of production application 140 and/or production application clone 148, for use in production environment 128.

Pentester 104 may use browser 106 and/or any pentest tools 108 (which may be identical to any hacking tools 168) to conduct penetration testing on the test application 120 in the penetration testing environment 110 (also known as a security testing environment). Pentest tools 108 or hacking tools 168 may include, without limitation, e.g., BBQSQL, j SQL Injection, sqlmap, etc., to detect and analyze SQL-injection vulnerabilities, for example. Numerous other tools may be used for reconnaissance, detection, analysis, and exploitation of various vulnerabilities in applications or services—the list provided above is not comprehensive.

In addition to test application 120, penetration testing environment 110 may also include session recorder 112, which may record session traffic, e.g., requests, responses, data, other accompanying network information, monitoring information, state information, etc., as part of a recorded session 116. Information for recording as session 116 may be retrieved in whole or in part via proxy 114 that may mediate transactions between test application 120 and pentester 104 via the pentester's browser 106 or pentest tools 108. In the case of a web application, proxy 114 may be a web proxy, for example.

Proxy 114 may be implemented in various other capacities as a network appliance, which may be physical, virtualized, or containerized, according to some embodiments. Session 116 may be recorded in an unstructured format or in a structured format at the time of recording. Session 116 may be restructured, in some embodiments, after initial recording, to facilitate processing for reinforcement learning or other machine learning, for example.

Separate from the penetration-testing environment 110 may be at least one production environment 128. Production environment 128 may be accessed by at least one legitimate user 186, who may have a similar browser 188 as that of pentester 104 (browser 106) or attacker 164 (browser 166), but it may be assumed, at least for purposes of the example of FIG. 1, that legitimate user 186 is not attacking production environment 128, and may be able to access production environment 128, within the scope of authorization for legitimate user 186, without disruption or interference by attacker 166.

Attacker 104 may use browser 166 and/or any hacking tools 168 (which may be identical to any pentest tools 108) to conduct an attack, presumably for malicious purposes as opposed to pre-authorized, sanctioned penetration testing. However, in some use cases, attacker 164 may be a hired security researcher tasked with penetration testing from the outside, more with a focus to test deception technology 130 in production environment 128 rather than to record any session 116 or attack episodes 174 for RL training 176.

In similar fashion to session recorder 112, transactions with production environment 128 may be mediated by proxy 132, which may be similar or identical to proxy 114. However, whereas proxy 114 may be configured to assume that its traffic is generally related to pentesting test application 120 and thus indented for recording as session 116, proxy 132 may use additional logic, in some embodiments, to distinguish malicious traffic from legitimate traffic and to identify attacker 164, thereby routing legitimate traffic to production application 140 and routing malicious traffic to production application clone 148, at least for at least one identified attacker 164. In some embodiments, different attackers may be routed to separate instances of production application clone 148.

Additional logic may include handlers for honeytokens 138 and/or detection points 136, as discussed elsewhere herein and/or in the documents incorporated by reference. Model 178 may be used by agent(s) 158, e.g., in response to any input or attack type from attacker 164. For real-time response to an actual live attack, model 178 may be used, e.g., by a given agent 158 to select a response action that has a greater probability of yielding a better reward for the given agent 158 based on input received from attacker 164. Any input from the attacker session may be recorded via proxy 132, for example. Recorded input log 134 may be any data store, structured or unstructured, that may be used to capture and store live attacker inputs to feed back to a future RL training session, in some embodiments, in order to improve performance in a subsequent version of the model 176 as retrained, and/or record as part of successful attack episodes 174 for later reference, according to some embodiments.

Structure of applications may be similar, e.g., across test application 120 and production application 140, having at least one application programming interface (API) and/or user interface (UI), such as UI 124 for test application 120 and UI 144 for production application 140. Applications may have access to storage, such as test database 126 and production database 146. An application may have its own runtime, such as runtime 122 for test application 120 or runtime 142 for production application 140.

UI input may be interactive or non-interactive (e.g., repeated via a script or macro), and may include use of a command-line interface (CLI), a terminal, textual, or text-based user interface (TUI), audible voice commands, or through a separate API, for example. Input may be effected via a graphical user interface (GUI) or other UI, such as using a position and movement or gestures, such as of a pointing device, which may include a hardware mouse, joystick, pointing stick, pressure sensor, trackball, touchpad, or other motion-tracking device as understood in the art. UI events may include keystroke(s) for a selected node (e.g., via GUI or TUI), and/or expanded via an event at the handle (e.g., via pointing device, touch screen, motion sensor, etc.).

Regardless of any potential differences between test application 120 and production application 140, it is expected that production application clone 148 may more closely mirror structure, functionality, and/or behavior of production application 140. Thus, production application clone 148 may have its own runtime 150 and UI 152 that may mirror runtime 144 and UI 144, for example. However, the storage available to production application clone 148 may be a fake database 154, which may include simulated data in lieu of production data, but not jeopardize any confidentiality, integrity, or availability of production database 146, protecting legitimate user 186. Fake database 154 may further include canary values, canarytokens, or other similar values that may further be used to identify attacker 166 in different contexts or environments.

FIG. 2 depicts an example mapping 200 of RL concepts to elements of a given RL environment 170, according to some embodiments.

As a non-limiting example, a given RL environment 170 may be implemented using OpenAI Gym environment. FIG. 2 presents a mapping of RL concepts to the elements of such an environment using OpenAI Gym. This environment has been privately tested as a proof of concept.

The RL environment 170 may support multiple agents and multiple policies of multiple types. The environment may be used to generate a representation for a vulnerable web application, for example, to be attacked or defended. The reward function may depend on the type of agents to be trained or deployed. For example, attacking agents (offensive agents) may be set to receive a positive reward when an actual vulnerability is found or exploited.

A deceptive agent (defensive agent) may be set to receive a positive reward for a repeated request from the attacker to exploit a parameter for a given web application page that is supposed to be vulnerable, to the extent that the attacker expends time or resources without becoming discouraged, giving up, or, in some use cases, exploiting what may otherwise be a critical vulnerability for a given application, service, system, or network, for example. An agent may follow its own policy configured to increase future reward, at least on average. In some embodiments, such an environment may allow different policies to be defined and tested by a data scientist or researcher actor, e.g., observer 102 shown in FIG. 1.

An example policy, which may be separately defined for different instances of agent(s) 158, may use deep learning (e.g., deep Q-networks for deep Q-learning, artificial-intelligence game engines, etc.) to increase or maximize reward or return, such as using an evolutionary algorithm, Bayesian optimization, or other suitable means or methods in order to select subsequent action(s), at any step, possibly at each step, where the selected subsequent action(s) may be determined to improve a likelihood of receiving higher rewards on average.

State may be defined as a description of the state of the world (e.g., relative to a given application, service, system, network, etc.). In one non-limiting example, per FIG. 2, there is no information about the world which is hidden from the state. State may be represented as some or all data in the application storage and some or all data already disclosed to the attacker (e.g., request/response log), according to some embodiments.

An observation may be defined as a partial description of a state. Thus, an observation may omit some information about the state, for example. For a given state, in some embodiments, an observation may be represented as part of the state, e.g., response status, any cookie(s), and any response body for the latest request.

Action spaces may be defined as different environments may allow different kinds of actions. The set of valid actions in a given environment may be referred to as the action space. Action spaces may be represented as some or all requests (e.g., of a finite set, in some cases) that may be sent, and possible responses. This may include HTTP verbs, cookies, parameter values, and payload to be submitted, for example, to a web application or service, according to some embodiments.

A policy may be defined as a rule or set of rules used by an agent to decide what actions to take. Rules may be deterministic or stochastic. For policy representations, types of rules may be implementation-specific; stochastic, deterministic, or a combination thereof may be used, for example.

A trajectory may be defined as a sequence of states and actions in the world. Trajectories are also frequently called episodes or rollouts. A trajectory may be represented, for example, as a session trace, a sequence of HTTP requests, corresponding responses, etc. An episode may finish when the attacker abandons without damaging confidentiality, integrity, or availability of a given application or service, according to some embodiments.

Reward (sometimes referred to as return) may be defined by a reward function /R/, for reinforcement learning. The reward function may depend on the current state, the action just taken (e.g., change of state leading to the current state), and a (possible or predicted) next state. According to some embodiments, a goal of an agent may be to increase cumulative reward or return over a given trajectory. Representations of reward or return as applied may be seen in some non-limiting practical examples: A defensive agent may be rewarded a point if an attacker tries to exploit the same parameter using the same attack action more than once. An offensive agent may be rewarded a point if it finds a vulnerability randomly inserted in an application when the environment is started, in some embodiments.

A Q-table may be defined as a list or equivalent representation of greatest expected future reward(s) for a given action at a given state, such as by a maximization function, Bayesian optimization, evolutionary algorithm, heuristic evaluation, or other suitable means or methods in order to select subsequent action(s). Specific representations of Q-tables may be defined according to experiments, e.g., per penetration tests, other known malicious inputs, or known vulnerabilities, according to some embodiments. If an objective metric of compromised confidentiality, integrity, or availability exceeds a predetermined level, for an attacker action due at least in part to a defensive agent, allow the defensive agent to score fewer points in return. Actions that fail to give new information to mount an attack (discouraging the attacker) deduct points. The more an attacker spends time or resources, the more the defensive agent is winning.

Any number of agents may be supported, e.g., in multi-agent reinforcement-learning environments 170. A reinforcement-learning environment 170 may react or interact in real time under a real or simulated attack or penetration test. However, real-time interaction may not be specifically required. According to some embodiments, pre-recorded traces of sessions or saved states may be used for episode selection and for experience replay, for example, via an experience replay manager 172 as shown in FIG. 1.

Session traces may or may not contain the full input and output content from the application requests and responses. In some embodiments, a streamlined representation corresponding to the application responses may be saved by collecting logs during the application security testing process.

Penetration-testing reports may indicate whether any vulnerable parameters were discovered, which may lead to later use of the same parameters to determine successful attack episodes 174 during RL training 176 phase(s). Any requests, parameters, state representations, etc., corresponding to attack episodes 174, may be stored and handled for processing by tools and/or frameworks that may be configured to assist with RL training 176, e.g., TensorFlow, Keras, PyTorch, etc. Any patterns detected in attack episodes 174 may be profiled, vectorized, or otherwise converted to a structured or otherwise machine-friendly representation, which may act as a signature, according to some embodiments.

Session traces from penetration testing may be used for training defensive agents across different applications in some situations. For example, in groups of applications that may share similar architecture, or that may be written in the same programming language, or that may use the same DBMS, in some embodiments, corresponding error messages, exceptions, error codes, input sanitization libraries, etc., may provide elements that software agents may learn to mimic. Similarly, software agents may learn not to mimic responses that may not make sense for applications (apps) written in disparate programming languages and/or frameworks (e.g., a NodeJS app versus a Java/Spring Framework app).

During runtime, provided that at least one honeytoken 138 has been triggered and that the corresponding session has been correctly re-routed by the proxy, a non-authenticated attacker may then interact only with an autonomous deceptive agent, according to some embodiments. Thus, the deceptive agent may autonomously reference a trained agent model (reinforcement-learning model 178) and accordingly select therefrom an appropriate response to the attacker's request(s) at a given step.

A resultant expectation may be that the autonomous deceptive agent will multiply the attacker effort by a significant factor, to leverage an advantageous yield of relatively limited resources provisioned by a service provider, to divert disproportionately more resources of an attacker. Benefits of this approach, according to embodiments of the enhanced techniques described herein, include asymmetric defense, as well as increased knowledge of attackers and attackers' techniques, which may be used as valuable input for training other defensive agents and/or for securing networks, systems, services, and applications in other ways.

Thus, reinforcement learning as described and applied per the enhanced techniques disclosed herein may favorably facilitate automation of cybersecurity defenses, including for web applications and other online services, as well as for local attacks or malware. Intelligent, autonomous cyber-deception may considerably reduce maintenance costs for self-defending applications, reducing needs for live monitoring from security professionals, while at the same time increasing costs to attackers.

Figure 3:
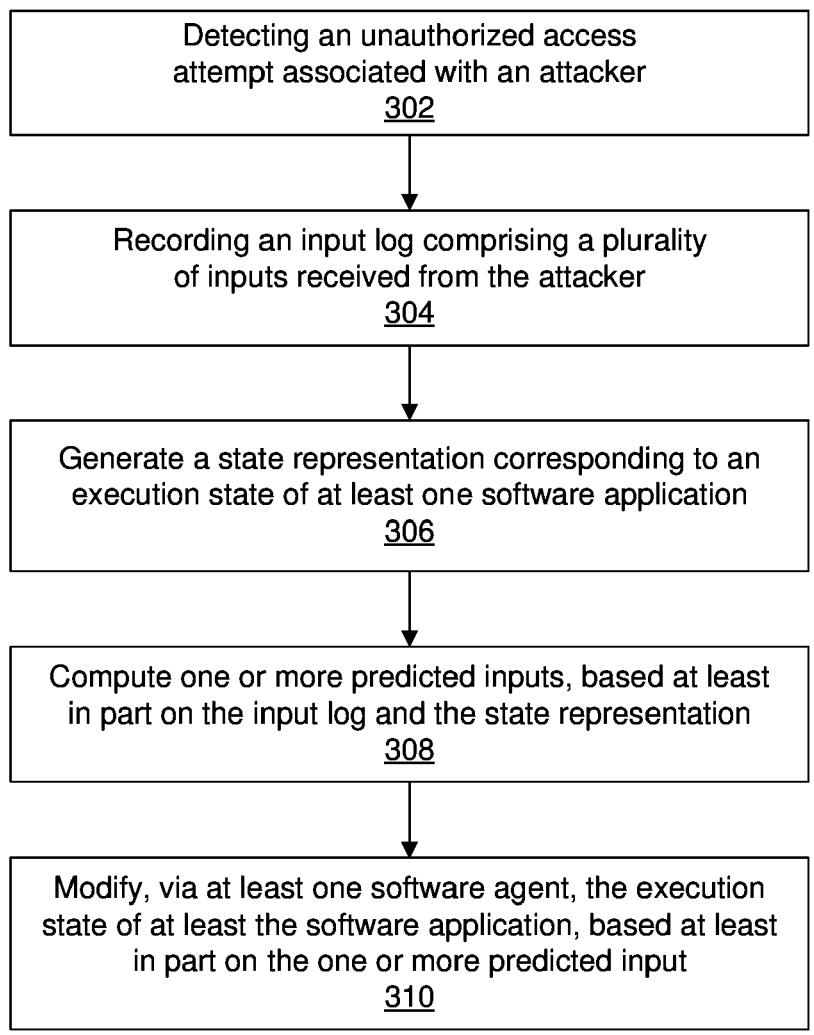
FIG. 3 is a flowchart illustrating a process implementing some of the enhanced techniques described herein, according to some embodiments.

FIG. 3 shows an example method 300 for use with reinforcement learning as applied to application responses using deception technology, according to some embodiments. Method 300 may be performed by processing logic that may comprise hardware (e.g., circuitry, dedicated logic, programmable logic, microcode, etc.), software (e.g., instructions executing on a processing device), or a combination thereof.

Method 300 shall be described with reference to FIGS. 1-4. However, method 300 is not limited only to those example embodiments. The steps of method 300 may be performed by at least one computer processor coupled to at least one memory device. An example processor and memory device(s) are described below with respect to 404 of FIG. 4. In some embodiments, method 300 may be performed using computer system 400 of FIG. 4, which may further include at least one processor and memory such as those of FIG. 4.

In 302, at least one processor 404 may detect unauthorized access attempt (also referred to as an intrusion attempt or attack), associated with an attacker. Detection of intrusion attempts may rely on various techniques, such as IDS, honeytokens, canarytokens, or equivalent means. In some embodiments, associating unauthorized access with an attacker may further involve logic relating to honeytokens, cookies, fingerprinting, signatures, etc., as described elsewhere herein and in documents incorporated by reference.

Example types of unauthorized access attempts (intrusion attempts or attacks) may include, without limitation, brute-force attacks, buffer-overflow attacks, SQL injection, code injection, XSRF, XSS, directory traversal, or the like. Attacks may be for authenticated or non-authenticated sessions, with different considerations for any type of session, as discussed further elsewhere herein.

As performed in 302, detection may also be based at least in part on machine learning or reinforcement learning based on training sets from penetration testing, actual attacks from previously, or a combination thereof. Training may be an iterative process, for example.

In 304, processor 404 may record an input log comprising a plurality of inputs received from the attacker. In some embodiments, the input log may be derived from a more comprehensive record of transactions and/or execution states associated with a given session. The input log and/or any other transaction logs may be recorded via a proxy, such as proxy 132, by way of which transactions may be mediated, e.g., between applications/services and users/attackers.

In 306, processor 404 may generate a state representation corresponding to an execution state of at least one software application. Execution state of at least one software application may be represented in any of various suitable formats, including compressed memory representation (e.g., binary data), plain text, structured text or markup, array, vector, matrix, tensor, etc. Format of the state representation may depend on which state(s) may be represented, or any architectural specifics of any application, service, system, network, etc., for which a state, including execution state, may be represented. The state representation format may be expected to have compatibility with various algorithms, e.g., for machine learning or reinforcement learning, according to some embodiments.

In 308, processor 404 may compute one or more predicted inputs, based at least in part on the input log and the state representation. For example, based at least in part on the state representation, following any given input from an attacker 164, computation of 308 may, in some embodiments, account for a current state and any latest request(s) as applicable.

Any requests, parameters, state representations, etc., corresponding to attack episodes 174, may be stored and handled for processing by tools and/or frameworks that may be configured to assist with RL training 176, e.g., TensorFlow, Keras, PyTorch, etc. Any patterns detected in attack episodes 174 may be profiled, vectorized, or otherwise converted to a structured or otherwise machine-friendly representation, which may act as a signature, according to some embodiments.

Based at least in part on models 134 and/or 178 generated or iterated upon via reinforcement learning, for example, at least one reward function may be evaluated with respect to any given software agent, so as to determine potential next steps to evaluate for high scores of predicted reward. Generally, the higher the score for a predicted reward (e.g., on average) of a given action that may be considered as a candidate action for an agent to perform, the more likely the agent may autonomously decide to take the given action. Any or all of these considerations may go into calculating one or more predicted inputs.

Thus, the computing of 308 may further include selecting the one or more predicted inputs from a set of candidate inputs derived using a reward function from a reinforcement-learning model. In some embodiments, the reinforcement-learning model may be trained based at least in part on inputs received from an attacker, test inputs from an authorized penetration tester, a plurality of known malicious inputs from a given dataset, or a combination thereof.

In 310, processor 404 may modify, via at least one software agent, the execution state of at least the software application, based at least in part on the one or more predicted input. For example, in order to increase potential engagement from an attacker 164, a web-application defense agent may lead an attacker to believe that XSRF protection is ineffective by responding with HTTP status code 200 (OK) for HTTP requests configured to change state of an application or service (e.g., POST, PUT, or DELETE), where such requests originate from other domains separate from that of the target application or service.

Additionally, or alternatively, processor 404 may reproduce a pattern of responses known to increase a likelihood of a specific or general attacker or type of attacker to attempt SQL injection or code injection, in some embodiments. Examples 1-4 above provide some non-limiting, non-exhaustive information regarding some potential ways to modify execution state of an application, if only to simulate certain vulnerabilities that may not actually be present in any given production application 140 (or production application clone 148 or test application 120), as discussed further elsewhere herein.

The modifying of 310 may be performed based at least in part on one or more algorithms configured to reduce a likelihood of the attacker ceasing the unauthorized access attempt(s), as may be determined per reward assigned to at least one agent per the reward function. An amount or degree of the reward may be based at least in part on a degree of correspondence between the one or more predicted inputs and one or more subsequent inputs received from the attacker following the modifying of 310.

Further, processor 404 may identify a type of the unauthorized access attempt, and may further modify (e.g., per 310) the execution state of at least the software application, based at least in part on the one or more predicted inputs and the type of the unauthorized access. According to some embodiments, the software application may include at least one web service, and the type of the unauthorized access attempt comprises cross-site scripting, cross-site request forgery, SQL injection, code injection, brute-force attack, buffer-overflow attack, or a combination thereof, for example.

Examples of how processor 404 may perform any operations or steps of method 300 are described further above, such as with respect to FIGS. 1 and 2, with respect to some embodiments.

Any or all of the above steps may be performed as part of embodiments as shown and described further above with respect to FIG. 2-8, in some embodiments. Additionally or alternatively, any or all of the above steps may be performed as part of processing demonstrated in FIGS. 3 and/or 4, for example.

Not all steps of process 300 may be needed in all cases to perform the enhanced techniques disclosed herein. Further, some steps of process 300 may be performed simultaneously, or in a different order from that shown in FIG. 3, as will be understood by a person of ordinary skill in the art.

Example Computer System

Figure 4:
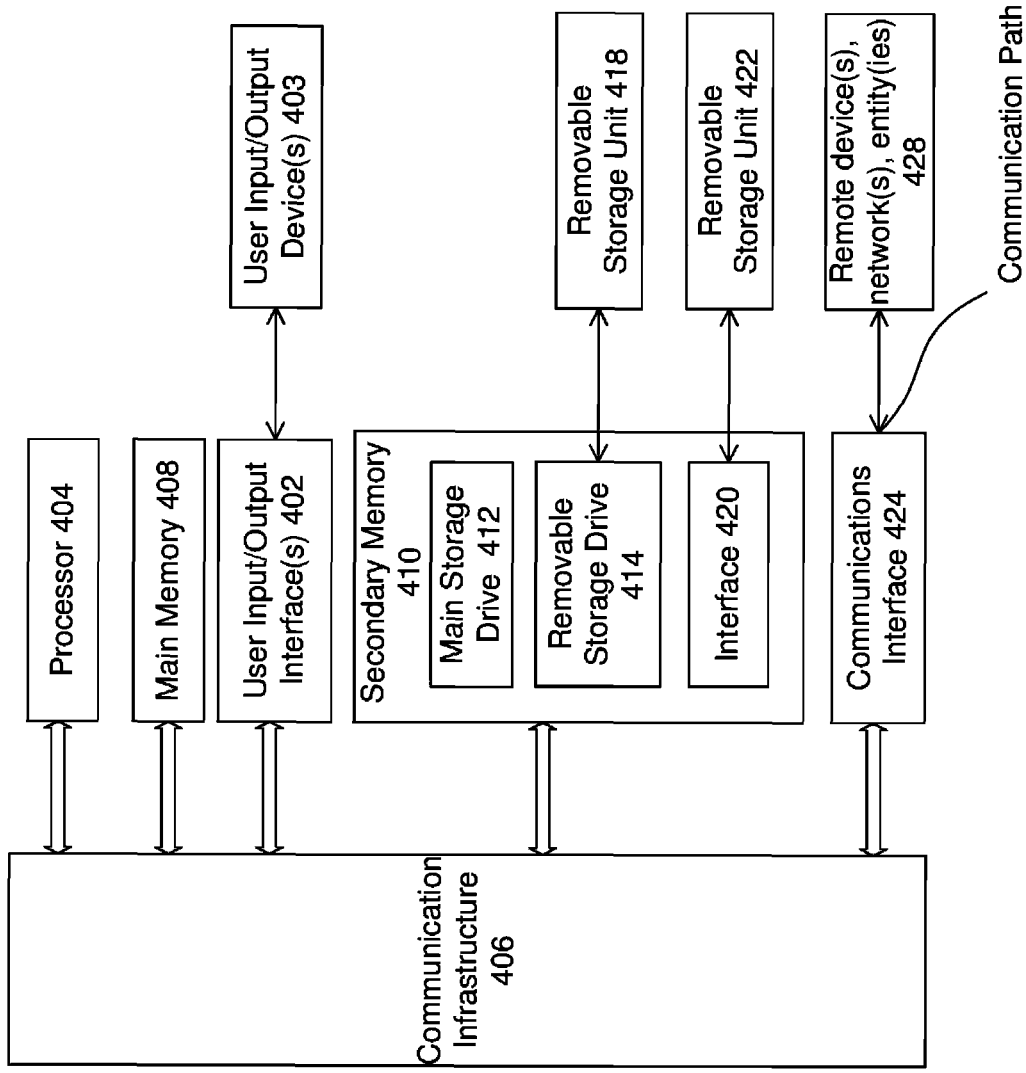
FIG. 4 is a block diagram of an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a bus or communication infrastructure 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, vector processing, array processing, etc., as well as cryptography (including brute-force cracking), generating cryptographic hashes or hash sequences, solving partial hash-inversion problems, and/or producing results of other proof-of-work computations for some blockchain-based applications, for example. With capabilities of general-purpose computing on graphics processing units (GPGPU), the GPU may be particularly useful in at least the machine-learning aspects described herein, including reinforcement-learning applications.

Computer system 400 may also include a main or primary memory 408, such as random access memory (RANI). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments may operate with software, hardware, and/or operating system implementations other than those described herein.

CONCLUSION

It is to be appreciated that the Detailed Description section, and not any other section, is intended to be used to interpret the claims. Other sections may set forth one or more but not all example embodiments as contemplated by the inventor(s), and thus, are not intended to limit this disclosure or the appended claims in any way.

While this disclosure describes example embodiments for example fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," "some embodiments," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

Additionally, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

The breadth and scope of this disclosure should not be limited by any of the above-described example embodiments, but should be defined only in accordance with the following claims and their equivalents.

What is claimed is:

1. A computer-implemented method of adapting a software application on a network in response to an unauthorized access attempt against the software application, the computer-implemented method comprising:
    detecting, by at least one computer processor, the unauthorized access attempt, wherein the unauthorized access attempt is associated with an attacker;
    recording, by the at least one computer processor, an input log comprising a plurality of inputs received from the attacker;
    generating, by the at least one computer processor, a state representation corresponding to an execution state of at least the software application;
    computing, by the at least one computer processor, one or more predicted inputs, based at least in part on the input log and the state representation; and
    modifying, by the at least one computer processor via at least one software agent, the execution state of at least the software application, based at least in part on the one or more predicted inputs;
    wherein the computing further comprises selecting, by the at least one computer processor via the network, the one or more predicted inputs from a set of candidate inputs derived using a reward function from the reinforcement-learning model, wherein the reinforcement-learning model is trained based on at least one of the plurality of inputs received from the attacker, a plurality of test inputs from an authorized penetration tester, and a plurality of known inputs from a given dataset;
    wherein the reward function is configured based at least in part on a type of the unauthorized access attempt;
    and wherein, per the reward function, a reward is assigned to the at least one software agent, based on a degree of correspondence between the one or more predicted inputs and one or more subsequent inputs received from the attacker following the modifying;
    and further wherein the modifying is performed based at least in part on one or more algorithms configured to reduce a likelihood of the attacker ceasing the unauthorized access attempt.

2. The computer-implemented method of claim 1, wherein:
    the software application is cloned from a corresponding application of a production system,
    the software application is configured to run separately from the production system, and
    the computer-implemented method further comprises routing, by the at least one computer-processor via the network, the attacker away from the production system and toward the software application in response to the detecting the unauthorized access attempt.

3. The computer-implemented method of claim 2, wherein the software application is further configured to provide to the attacker access to simulated data in lieu of production data.

4. The computer-implemented method of claim 1, further comprising:
    identifying, by the at least one computer processor, a type of the unauthorized access attempt;
    modifying, by the at least one computer processor, the execution state of at least the software application, based at least in part on the one or more predicted inputs and the type of the unauthorized access attempt.

5. The computer-implemented method of claim 4, wherein:
    the software application comprises at least one web service, and
    the type of the unauthorized access attempt comprises cross-site scripting, cross-site request forgery, SQL injection, code injection, brute-force attack, buffer-overflow attack, or a combination thereof.

6. A non-transitory computer readable storage medium storing instructions that, when executed by at least one computer processor, cause the at least one computer processor to perform operations of adapting a software application on a network in response to an unauthorized access attempt against the software application, the operations comprising:
   detecting the unauthorized access attempt, wherein the unauthorized access attempt is associated with an attacker;
   recording an input log comprising a plurality of inputs received from the attacker;
   generating a state representation corresponding to an execution state of at least one software application;
   computing one or more predicted inputs, based at least in part on the input log and the state representation; and
   modifying, via at least one software agent, the execution state of at least the software application, based at least in part on the one or more predicted inputs;
   wherein the computing further comprises selecting the one or more predicted inputs from a set of candidate inputs derived using a reward function from the reinforcement-learning model, wherein the reinforcement-learning model is trained based on at least one of the plurality of inputs received from the attacker, a plurality of test inputs from an authorized penetration tester, and a plurality of known inputs from a given dataset;
   wherein the reward function is configured based at least in part on a type of the unauthorized access attempt;
   and wherein, per the reward function, a reward is assigned to the at least one software agent, based on a degree of correspondence between the one or more predicted inputs and one or more subsequent inputs received from the attacker following the modifying,
   and further wherein the modifying is performed based at least in part on one or more algorithms configured to reduce a likelihood of the attacker ceasing the unauthorized access attempt.

7. The non-transitory computer readable storage medium of claim 6, wherein:
   the software application is cloned from a corresponding application of a production system,
   the software application is configured to run separately from the production system, and
   the operations further comprise routing the attacker away from the production system and toward the software application in response to the detecting the unauthorized access attempt, wherein the software application is further configured to provide to the attacker access to simulated data in lieu of production data.

8. The non-transitory computer readable storage medium of claim 6, the operations further comprising:
   identifying, by the at least one computer processor, a type of the unauthorized access attempt;
   modifying, by the at least one computer processor, the execution state of at least the software application, based at least in part on the one or more predicted inputs and the type of the unauthorized access attempt.

9. The non-transitory computer readable storage medium of claim 8, wherein:
   the software application comprises at least one web service, and
   the type of the unauthorized access attempt comprises cross-site scripting, cross-site request forgery, SQL injection, code injection, brute-force attack, buffer-overflow attack, or a combination thereof.

10. A system configured to adapt a software application on a network in response to an unauthorized access attempt to the software application, the system comprising:
   a memory; and
   at least one computer processor configured to execute instructions, stored in the memory, that cause the at least one computer processor to perform operations comprising:
      detecting the unauthorized access attempt, wherein the unauthorized access attempt is associated with an attacker;
      recording an input log comprising a plurality of inputs received from the attacker;
      generating a state representation corresponding to an execution state of at least one software application;
      computing one or more predicted inputs, based at least in part on the input log and the state representation; and
      modifying, via at least one software agent, the execution state of at least the software application, based at least in part on the one or more predicted input;
      wherein the computing further comprises selecting the one or more predicted inputs from a set of candidate inputs derived using a reward function from a reinforcement-learning model, and wherein the reinforcement-learning model is trained based on at least one of the plurality of inputs received from the attacker, a plurality of test inputs from an authorized penetration tester, and a plurality of known inputs from a given dataset;
      wherein the reward function is configured based at least in part on a type of the unauthorized access attempt;
      and wherein the reward function is configured based at least in part on a type of the unauthorized access attempt;
      and wherein, per the reward function, a reward is assigned to the at least one software agent, based on a degree of correspondence between the one or more predicted inputs and one or more subsequent inputs received from the attacker following the modifying operation;
      and further wherein the modifying operation is performed based at least in part on one or more algorithms configured to reduce a likelihood of the attacker ceasing the unauthorized access attempt.

11. The system of claim 10, wherein:
   the software application is cloned from a corresponding application of a production system,
   the software application is configured to run separately from the production system, and
   the operations further comprise routing the attacker away from the production system and toward the software application in response to the detecting the unauthorized access attempt.

12. The system of claim 11, wherein:
   the software application is further configured to provide to the attacker access to simulated data in lieu of production data.

13. The system of claim 10, the operations further comprising:
   identifying, by the at least one computer processor, a type of the unauthorized access attempt;
   modifying, by the at least one computer processor, the execution state of at least the software application, based at least in part on the one or more predicted inputs and the type of the unauthorized access attempt.

14. The system of claim 13, wherein:
the software application comprises at least one web service, and
the type of the unauthorized access attempt comprises cross-site scripting, cross-site request forgery, SQL injection, code injection, brute-force attack, buffer-overflow attack, or a combination thereof.

* * * * *